A. A. LUDEMAN.
LIQUID WEIGHING DEVICE.
APPLICATION FILED JULY 21, 1915.

1,202,077.

Patented Oct. 24, 1916.

WITNESSES:
Frederick G. Kimlin
Charles V. Dwyer

INVENTOR.
Arthur A. Ludeman,
BY
ATTORNEY

UNITED STATES PATENT OFFICE.

ARTHUR A. LUDEMAN, OF NEW YORK, N. Y.

LIQUID-WEIGHING DEVICE.

1,202,077.　　　　　Specification of Letters Patent.　　Patented Oct. 24, 1916.

Application filed July 21, 1915.　Serial No. 41,047.

*To all whom it may concern:*

Be it known that I, ARTHUR A. LUDEMAN, a citizen of the United States, and resident of the city, county, and State of New York, have invented certain new and useful Improvements in Liquid-Weighing Devices, of which the following is a specification.

This invention relates to liquid weighing devices for use on the usual beer or ale faucets and has for its objects the production of a duplex device whereby liquid may be drawn from two faucets at one time.

A further object of the invention is a device which is quickly removed and placed into position on any two of a series of faucets, usually found in bar rooms, without the use of any fastening means.

Figure 1:
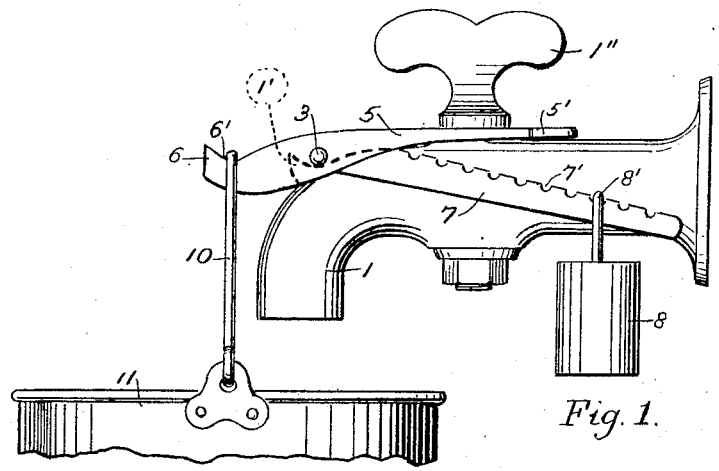
Figure 2:
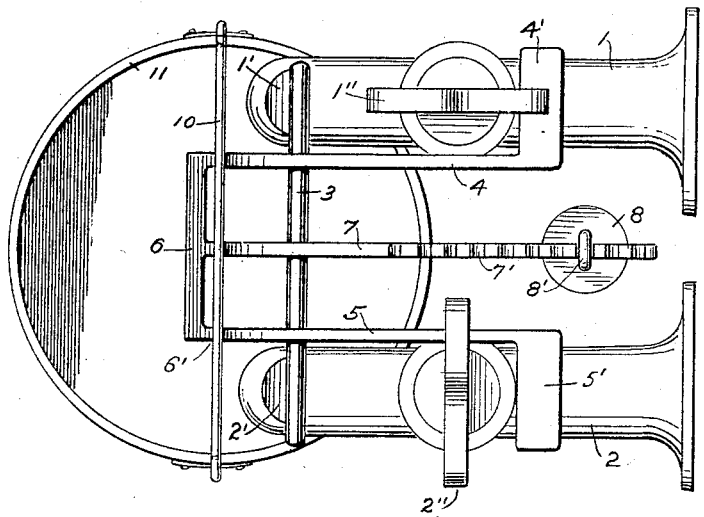

In the accompanying drawing Figure 1 is a side elevation of my invention, one faucet, toward the observer being removed, and Fig. 2 is a plan view showing the device placed on two faucets.

Similar reference characters denote like parts in the two views.

The faucets 1, 2, have the usual horns 1', 2' and handles 1'', 2''. Faucet, 1, shows the handle turned "on" and faucet 2 shows handle turned "off" for illustrating the operation.

The device is preferably cast integral though it may be "built up" of separate pieces, properly fastened together.

A round rod, 3, extends outwardly beyond two levers, one, 4, being left and the other lever, 5, being right. On the free end of these levers an elbow 4', 5' respectively extend at right angles to the left and right as shown. At the connected end of these levers they are united by a connecting piece, 6, which extends a suitable distance outwardly from the rod, 3, which rod is the fulcrum: between the rod, 3, and the connecting piece, 6, the levers are shaped to form a V shaped groove 6' upon which the bail, 10, of a kettle, 11, or other suspended receptacle hangs. Midway between the two said levers is a scale beam, 7, having notches, 7', disposed upon its upper edge for the purpose of engaging the weight, 8, which is suspended from said bar by a loop, 8': each notch represents a predetermined amount of liquid.

The operation is as follows: We will assume faucet, 1, is connected with a freshly tapped barrel of beer, and faucet, 2, is connected with a barrel one quarter or one half full. The rod is placed upon the horns of the two said faucets—as shown in Fig. 2—the bail of the kettle is placed in the groove near the connection piece, which brings the kettle under each faucet; the weight is moved on the scale to counterbalance the weight of the kettle, (usually one or two notches from the front end) and when this is determined the weight is moved the required number of notches to weigh the quantity of beer desired to be drawn. Both faucets are opened, the one furnishing principally foam, and the other one solid liquid. When the amount has been drawn, the weight of the kettle and beer counterbalances the levers and scale bar, and in raising them the elbows of the former strike up under the handle, as shown at faucet, 1, Fig. 2, when both handles are turned off. If it is desired to draw beer and ale for instance, the device is shifted to the two faucets connecting with barrels containing said liquid, and the operation is repeated. With one weighing device, any number of faucets can be instantly operated by simply placing it on adjoining faucets. When not in use as a weighing device, that is, when beer is drawn into glasses or mugs, it is out of the way and in no manner interferes with the manipulation of the handles or the vision. If desired a number of these devices may be placed on a series of faucets and left there for instant use, which is often the case in large saloons where a number of barkeepers are employed.

The device is easily cleaned and kept in a sanitary condition.

Such being my invention what I claim as new is:

1. In a weighing device, a pair of levers, one right and the other left, elbows extending therefrom, a fulcrum rod carried by said levers near the forward ends thereof and having its ends projecting beyond the levers, a scale beam disposed between said levers and extending rearwardly of the fulcrum rod, and a weight suspended from said scale beam.

2. In a weighing device, a pair of levers each having an elbow at its inner end, the elbows extending in opposite directions, a cross bar connecting said levers at their forward ends, a fulcrum rod carried by the levers near their forward ends and projecting at its ends beyond the levers, a scale beam lying between the levers and connected at its forward end to said cross bar, and a weight suspended from said scale beam.

Signed at New York city in the State of New York this twentieth day of July, A. D. 1915.

ARTHUR A. LUDEMAN.

Witnesses:
H. F. SCHUMACHER,
T. A. BANDSMAN.

Copies of this patent may be obtained for five cents each, by addressing the "Commissioner of Patents, Washington, D. C."